United States Patent [19]
Earl

[11] Patent Number: 5,924,104
[45] Date of Patent: Jul. 13, 1999

[54] METHOD AND APPARATUS FOR DISPLAYING INTRADOCUMENT LINKS IN A COMPUTER SYSTEM

[75] Inventor: Joel R. Earl, Rochester, Minn.

[73] Assignee: International Business Machines Corporation, Armonk, N.Y.

[21] Appl. No.: 08/720,777

[22] Filed: Oct. 3, 1996

[51] Int. Cl.[6] .................................................. G06F 17/30
[52] U.S. Cl. ................................. 707/501; 707/501
[58] Field of Search .................................. 707/501–502, 707/1; 345/356

[56] References Cited

U.S. PATENT DOCUMENTS

| | | | |
|---|---|---|---|
| 4,964,077 | 10/1990 | Eisen et al. ............................. | 364/900 |
| 5,204,947 | 4/1993 | Bernstein et al. ...................... | 395/157 |
| 5,297,249 | 3/1994 | Bernstein et al. ...................... | 345/356 |
| 5,367,621 | 11/1994 | Cohen et al. ........................... | 707/501 |
| 5,544,360 | 8/1996 | Lewak et al. ........................... | 707/1 |

OTHER PUBLICATIONS

"Through Hypertext" by Jakob Nielsen, Communication of the ACM, Mar. 1990. vol. 33, No. 3, pp. 297–310.
"Contexts—A Partitioning Concept for Hypertext" by Norman M. Delisle & Mayer D. Schwartz, Tektronix, Inc., vol. 5, No. 2, Apr. 1987, pp. 168–186.
"Hypertext:An Introduction and Survey" by Jeff Conklin, Microelectronics and Computer Technology Corp., Sep. 1987 IEEE pp. 17–41.

*Primary Examiner*—Joseph H. Feild
*Assistant Examiner*—John L. Young
*Attorney, Agent, or Firm*—Joan Pennington

[57] ABSTRACT

An improved method and apparatus are provided for displaying links on a user display interface in a computer system. A document is parsed to identify links. The identified links are checked to identify intradocument links. The identified intradocument links are displayed in a first presentation style. Other links are displayed in a second presentation style. In accordance with a feature of the invention, the visual cues provided by the distinct presentation styles for intradocument links and interdocument links assist computer users in navigating documents.

12 Claims, 4 Drawing Sheets

1 …

METHOD AND APPARATUS FOR DISPLAYING INTRADOCUMENT LINKS IN A COMPUTER SYSTEM

FIELD OF THE INVENTION

The present invention relates to a computer or data processing system, and more particularly, to methods and apparatus for displaying links on a user display interface in a computer system.

DESCRIPTION OF THE PRIOR ART

Computer systems often include an application for online presentation of documents. A non-sequential approach to the presentation of information or documents typically is provided for the user. Many online documents contain links that can be selected to navigate to different sections in the same document or to other related documents. One of the problems this creates is the "going in circles" phenomenon, in which the reader is led through a series of links back to material that has already been read.

One subset of this problem is specific to links within a single document. When a reader intends to read an entire document from start to finish, it is disruptive to follow a link to some later section of the document, read that section, go back to the departure point to resume sequential reading, and then encounter later the section that was read when following a particular document link. Or in another case, a particular link may point to earlier material in a document. The reader may follow the particular link, thinking that it leads to new information on that topic, while arriving at the section that was already read.

A need exists to provide an improved method and apparatus for displaying links on a user display interface in a computer system.

SUMMARY OF THE INVENTION

A principal object of the present invention is to provide an improved method and apparatus for displaying links on a user display interface in a computer system. Other important objects of the present invention are to provide such improved methods and apparatus for displaying links that enables the user to effectively and efficiently access user selected information; to provide such improved methods and apparatus substantially without negative effects and that overcome many disadvantages of prior art arrangements.

In brief, an improved method and apparatus are provided for displaying links on a user display interface in a computer system. A document is parsed to identify links. The identified links are checked to identify intradocument links. The identified intradocument links are displayed in a first presentation style. Other links are displayed in a second presentation style.

In accordance with a feature of the invention, the visual cues provided by the distinct presentation styles for intradocument and interdocument links assist computer users in navigating documents.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
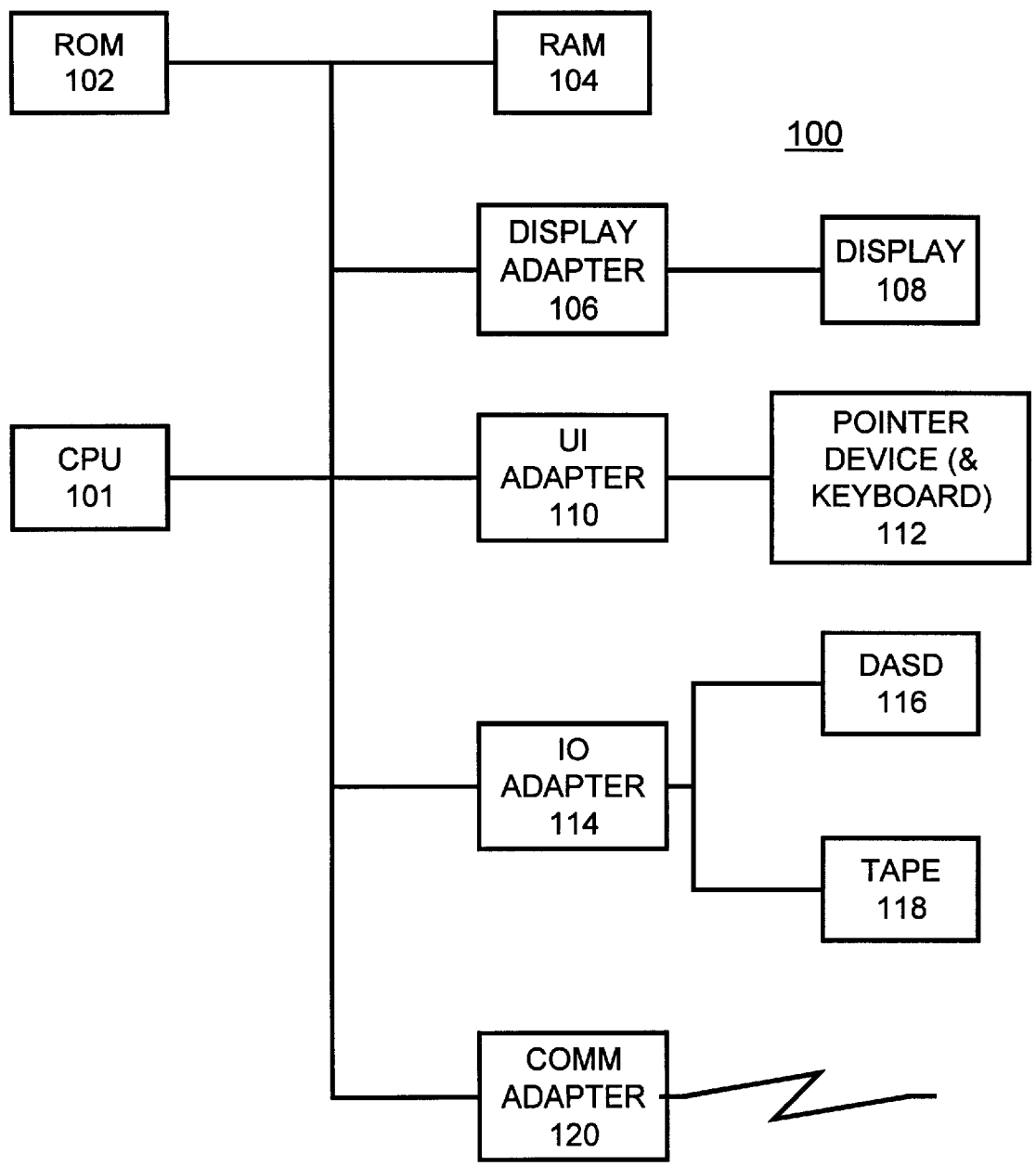
FIG. 1 is a block diagram representation of a computer or data processing system of the preferred embodiment.

Having reference now to the drawings, in FIG. 1 there is shown a computer or data processing system of the preferred embodiment generally designated by the reference character 100. As shown in FIG. 1, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

Various commercially available processors could be used for computer system 100, for example, an IBM personal computer or similar workstation can be used. Central processor unit 101 is suitably programmed to execute the logical flow of FIGS. 3 and 4 and to generate the link visual cues of FIG. 2 of the preferred embodiment.

Figure 2:
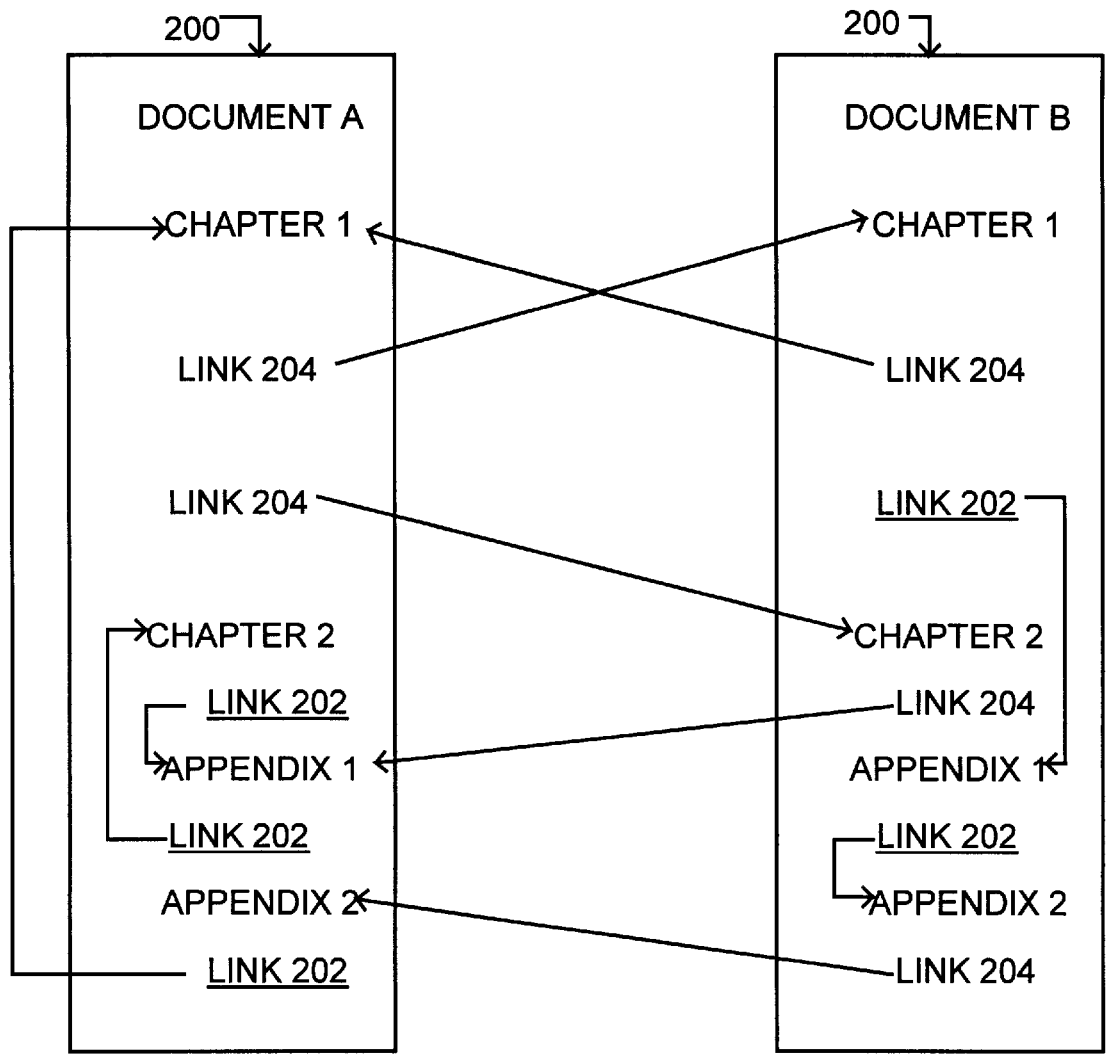
FIG. 2 is a diagram illustrating interdocument and intradocument links in accordance with the present invention.
Figure 3:
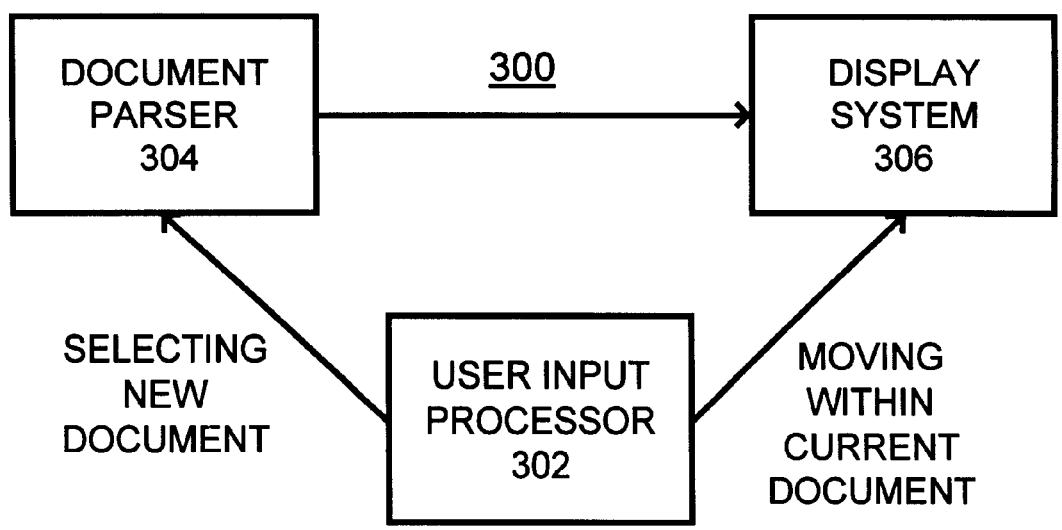
FIG. 3 is a block diagram illustrating a link display manager for presenting links in accordance with the present invention.
Figure 4:
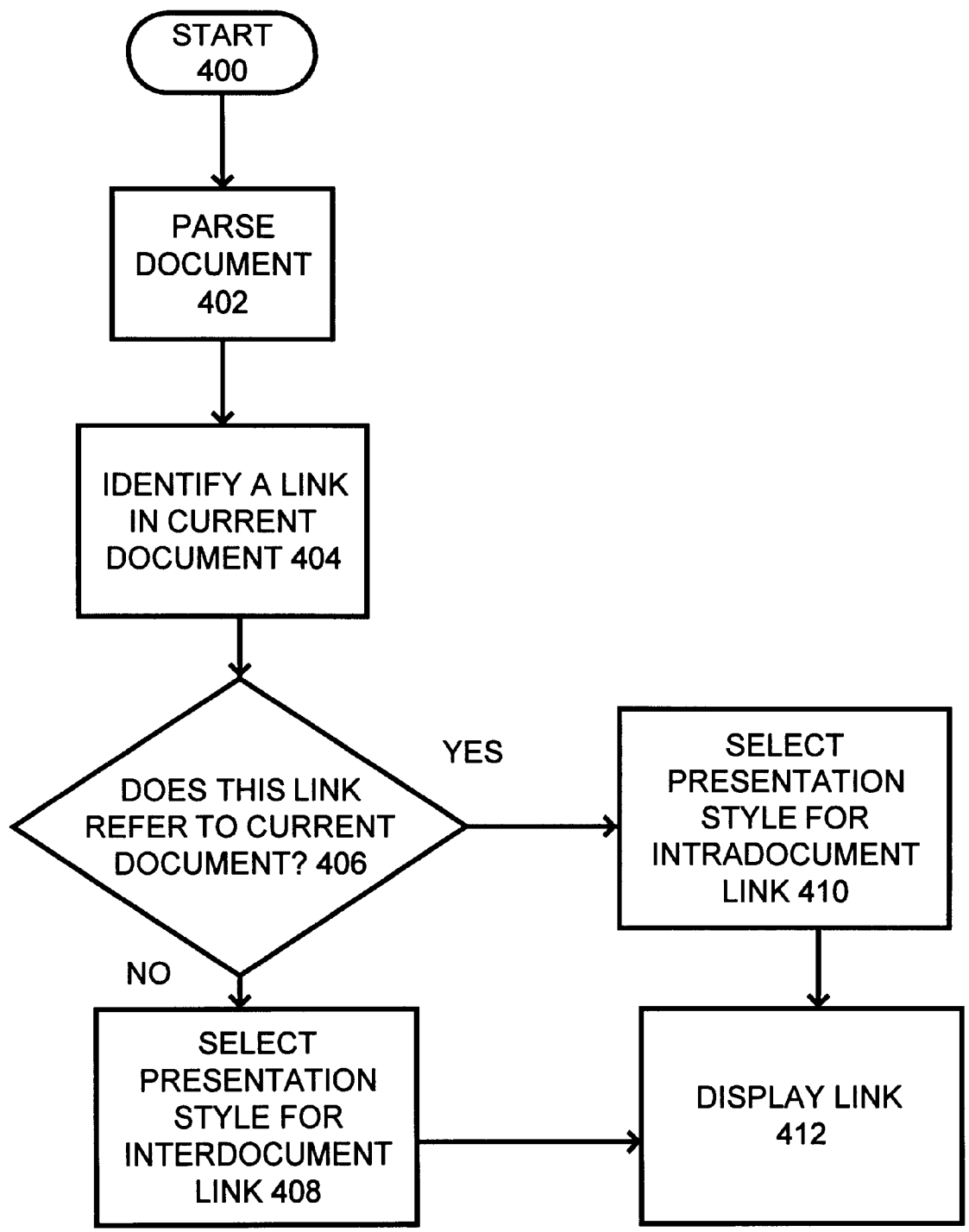
FIG. 4 is a logic flow diagram illustrating the method and apparatus of the preferred embodiment.

Referring now to FIGS. 2, 3 and 4, method and apparatus for displaying links 202, 204 on a user display interface 108 in the computer system 100 are illustrated. As shown in FIG. 2, two separate documents A and B 200 include both intradocument links 202 and interdocument links 204. Each document A and B 200 includes information, such as multiple chapters and appendixes, that can be reviewed by the user by scrolling, without following any links. Intradocument links 202 are selected by a user input, such as by pressing a mouse button, to review a different section of a current document. Interdocument links 202 are selected by a user input to review a particular section of a different document, such as to move from a current document A to document B.

In accordance with a feature of the invention, a predetermined color or other predefined visual cues are associated with each link 202 and with each link 204 to effectively and efficiently enable the reader of a particular document 200 to distinguish a particular link 202 which connects to another point in the same document and a particular link 204 which connects to another document. As a result, the user can make a more informed decision on whether to follow the particular links 202, 204. The links 202, 204 are available to follow if the user wished to do so, but if the user planned to read the entire document 200 anyway, the user could choose not to follow the links 202 with the assurance that they will eventually reach the section to which each link 202 points.

In FIG. 3, a link display manager 300 is illustrated in functional block diagram form. The link display manager 300 includes a user input processor 302 for processing user link selections as indicated at lines labeled MOVING WITHIN CURRENT DOCUMENT and SELECTING NEW DOCUMENT. The link display manager 300 includes a document parser 304 for parsing each document and identifying links 202 and 204 and a display system for defining predetermined screen element properties providing visual cues for distinguishing the identified links 202 and 204. When a user provides an input link selection to select a new document, the document parser 304 parses the selected new document to identify intradocument links 202 and interdocument links 204. The display system 306 processes the identified intradocument links 202 and interdocument links 204 for displaying distinctively the intradocument links 202 and interdocument links 204 with predetermined visual cues to differentiate the links 202, 204.

IN FIG. 4, exemplary sequential steps of the link display manager function 300 for link processing performed by the central processor unit 101 begin as indicated at a block 400. When a new document is selected, document parser 304 is called to parse the document as indicated at a block 402. A link in the current document is identified as indicated at a block 404. Then it is determined whether the identified link refers to the current document as indicated at a decision block 406. When determined that the identified link does not refer to the current document, then a predefined presentation style for an interdocument link 204 is selected as indicated at a block 408. Otherwise when determined that the identified link does refer to the current document, then a presentation style for an intradocument link 202 is selected as indicated at a block 410. The intradocument links 202 and interdocument links 204 are displayed with the distinct predefined presentation styles as indicated at a block 412.

One example of implementation of the link display manager 300 with a web browser includes the addition of a routine to the HTML parsing code that performs a lexical comparison of the link address to the path of the current document. This link display manager routine utilizes current directories and constructs, such as, "./". When a particular link 202, 204 is determined to be internal to the document 200, the identified link 202 can be displayed, for example, in a lighter shade of blue than that used for the links 204 external to the document.

The lexical comparison required in the preceding implementation example can be more easily understood with some examples of links in the HTML language. Links in other markup languages are conceptually similar. The following five examples are all links to a section labeled "network" in a file named "synutil.html".

EXAMPLE 1

<A HREF-"/afs/rchland/user5/earl/synutil.html#network">network</A>

Example 1 is an absolute specification in terms of a local filesystem.

EXAMPLE 2

<A HREF="HTTP://w3rchland.ibm.com/~earl/synutil.html#network">network</A>

Example 2 is an absolute specification in terms of a server name and location on that server.

EXAMPLE 3

<A HREF-"synutil.html#network">network</A>

This link has a file name with no path, implying the same directory as the current document. If the file name matches this of the current document, then they are the same file and the link is internal.

EXAMPLE 4

<A HREF="./syntil.html#network">network</A>"." is an abbreviation for the directory of the current document, and ".." is an abbreviation for the parent of a directory. Algorithms exist for expanding these abbreviations into directory paths.

EXAMPLE 5

<A HREF="#network">network</A>

This link has no file name so it must be an internal link.

The path to a current document will take the form of either example 2 or example 1. If the document 200 contains a link 202 to itself that is in the other of the two forms, there will be no way to reliably determine that the link is internal. However, absolute link specifications are bad style in page design for maintainability and cross platform access flexibility, so such a link would be undesirable for other reasons as well.

Figure 5:
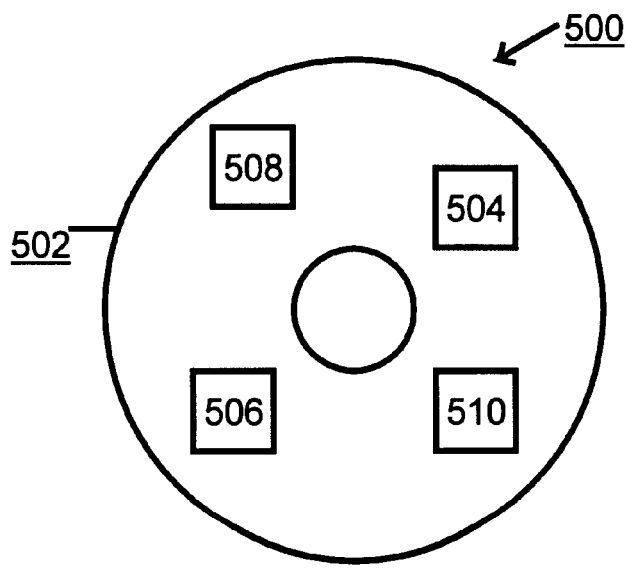
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the intradocument and interdocument link presentation method of the preferred embodiment in the system 100 of FIG. 1.

A sequence of program instructions or a logical assembly of one or more interrelated modules defined by the recorded program means 504, 506, 508, 510, direct the computer system 100 for implementing link display management of the preferred embodiment.

While the present invention has been described with reference to the details of the embodiments of the invention shown in the drawing, these details are not intended to limit the scope of the invention as claimed in the appended claims.

What is claimed is:

1. A method for displaying links on a user interface display screen in a computer system comprising the steps of:

parsing a document to identify links;

checking the identified links to identify intradocument links; the intradocument links being arranged for selection by a user to review a different section within the parsed document;

displaying the identified intradocument links in a first presentation style; and displaying other links in a second, different presentation style.

2. A method for displaying links on a user interface display screen as recited in claim 1 wherein the steps of displaying the identified intradocument links in said first presentation style; and displaying other links in said second, different presentation style includes the steps of displaying predetermined first visual cues with the identified intradocument links and displaying predetermined second visual cues with the identified other links.

3. A method for displaying links on a user interface display screen as recited in claim 1 wherein the steps of displaying the identified intradocument links in said first presentation style; and displaying other links in said second, different presentation style includes the steps of displaying a first color with the identified intradocument links and displaying a second color with the identified other links.

4. A method for displaying links on a user interface display screen as recited in claim 1 wherein the steps of displaying the identified intradocument links in said first presentation style; and displaying other links in said second, different presentation style includes the steps of displaying the identified intradocument links with underlining and displaying the identified other links without underlining.

5. A method for displaying links on a user interface display screen as recited in claim 1 wherein the step of checking the identified links to identify intradocument links includes the step of comparing a link address with an identifier of the parsed document.

6. Apparatus for displaying links on a user interface display screen in a computer system comprising:

means for parsing a document to identify links;

means for checking the identified links to identify intradocument links; the intradocument links being arranged for selection by a user to review a different section within the parsed document;

means for displaying the identified intradocument links in a first presentation style; and means for displaying other links in a second, different presentation style.

7. Apparatus for displaying links on a user interface display screen as recited in claim 6 wherein said means for checking the identified links to identify intradocument links include means for comparing a link address with an identifier of the parsed document.

8. Apparatus for displaying links on a user interface display screen as recited in claim 6 wherein said means for displaying the identified intradocument links in said first presentation style; and said means for displaying other links in said second, different presentation style includes means for displaying a first color with the identified intradocument links and means for displaying a second color with the identified other links.

9. Apparatus for displaying links on a user interface display screen as recited in claim 6 wherein said means for displaying the identified intradocument links in said first presentation style; and said means for displaying other links in said second, different presentation style includes means for displaying a first predefined visual cue with the identified intradocument links and means for displaying a second predefined visual cue with the other identified links.

10. A computer program product for use in a computer system having a processor for displaying links on a user interface display screen, the computer program product comprising:

a recording medium;

means, recorded on the recording medium, for parsing a document to identify links;

means, recorded on the recording medium, for checking the identified links to identify intradocument links; the intradocument links being arranged for selection by a user to review a different section within the parsed document;

means, recorded on the recording medium, for displaying the identified intradocument links in a first presentation style; and means, recorded on the recording medium, for displaying other links in a second, different presentation style.

11. A computer program product for use in a computer system having a processor for displaying links on a user interface display screen as recited in claim 10 wherein said first presentation style and said second, different presentation style include predetermined distinct visual cues for said first and second presentation styles.

12. A computer program product for use in a computer system having a processor for displaying links on a user interface display screen as recited in claim 10 wherein said means, recorded on the recording medium, for checking the identified links to identify intradocument links include means for comparing a link address with an identifier of the parsed document.

* * * * *